(12) United States Patent
Mitsui et al.

(10) Patent No.: US 7,411,622 B2
(45) Date of Patent: Aug. 12, 2008

(54) VIDEO SIGNAL PROCESSOR

(75) Inventors: Takahiro Mitsui, Osaka (JP); Mikio Fujiwara, Osaka (JP); Katsuji Uro, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 633 days.

(21) Appl. No.: 10/986,851

(22) Filed: Nov. 15, 2004

(65) Prior Publication Data

US 2005/0105468 A1 May 19, 2005

(30) Foreign Application Priority Data

Nov. 17, 2003 (JP) .............................. P2003-386612

(51) Int. Cl.
*H04N 5/335* (2006.01)
(52) U.S. Cl. ...................... 348/312; 348/296; 348/367; 348/427.1; 348/440.1; 348/459
(58) Field of Classification Search ................ 348/296, 348/312, 362, 367, 439.1, 440.1, 427.1, 459, 348/42.1, 457
See application file for complete search history.

(56) References Cited

U.S. PATENT DOCUMENTS

| | | | | |
|---|---|---|---|---|
| 4,709,277 A | * | 11/1987 | Ninomiya et al. ............. 386/52 |
| 4,800,435 A | * | 1/1989 | Ikeda et al. .................. 348/296 |
| 4,935,816 A | * | 6/1990 | Faber .......................... 348/578 |
| 5,162,914 A | * | 11/1992 | Takahashi et al. ......... 348/229.1 |
| 5,191,427 A | * | 3/1993 | Richards et al. ............... 348/97 |
| 5,446,497 A | * | 8/1995 | Keating et al. ............... 348/443 |
| 5,493,330 A | * | 2/1996 | Tomura et al. .............. 348/102 |
| 5,606,366 A | * | 2/1997 | Hieda et al. .................. 348/297 |
| 5,754,248 A | * | 5/1998 | Faroudja ...................... 348/474 |
| 5,831,673 A | * | 11/1998 | Przyborski et al. .......... 348/239 |
| 6,141,049 A | * | 10/2000 | Harada ........................ 348/296 |
| 2002/0021364 A1 | * | 2/2002 | Asada et al. ................. 348/312 |
| 2004/0017510 A1 | * | 1/2004 | Honda et al. ................. 348/459 |

FOREIGN PATENT DOCUMENTS

JP 2003-284007 10/2003

* cited by examiner

*Primary Examiner*—Tuan Ho
*Assistant Examiner*—Chriss S Yoder, III
(74) *Attorney, Agent, or Firm*—McDermott Will & Emery LLP

(57) ABSTRACT

The video signal processor of the present invention comprises a CCD for storing an inputted image by converting it into an electric charge through photoelectrical conversion to be stored by each field and then outputting the stored electric charge by each field; a shutter pulse generator for supplying a shutter pulse which adjusts storage time of the electric charge in the CCD; and a variable controller for variably controlling adjusting amount of electric charge storage time by the shutter pulse by a field unit.

4 Claims, 13 Drawing Sheets

F I G. 1
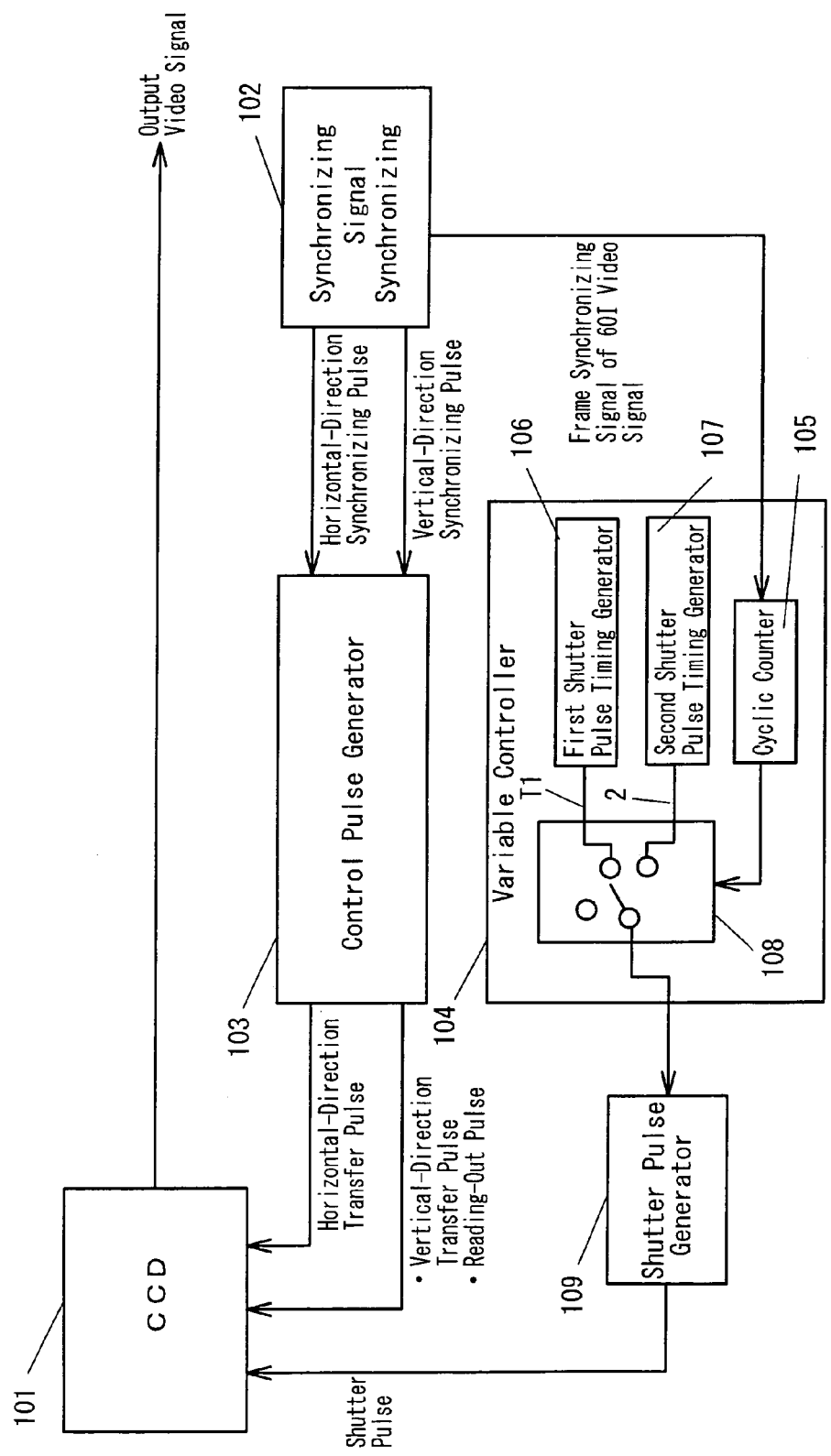

VIDEO SIGNAL PROCESSOR

BACKGROUND OF THE INVENTION

1. Field of the Invention

The present invention relates to a video signal processor which performs video conversion on digitalized video signals.

2. Description of the Related Art

There are video format conversions which enables to display a video being shot in a film such as a movie or a video signal formed by a CCD device which picks the image by the equivalent frame number (24 frames/second) on a TV set of NTSC type, or which enables the image or the video signal to be recorded on a recording device such as a VCR (Video Cassette Recorder). As an example of such video format conversions, known is a 2:3 pull-down system or 2:3:3:2 pull-down system. As for the pull-down format conversion, as disclosed in Japanese Unexamined Patent Publication No. 2003-284007, known is the one in which the format conversion on an input side and an output side by a respective synchronous system, so as to smoothen the visibility of the video after the format conversion.

By performing such video format conversion, a progressive video signal (referred to as 24P video signal hereinafter) formed by 24 frames/second can be finely converted to an interlace signal (referred to as 60I video signal) formed by 60 fields/second) for the TV set of NTSC type and the VCR device. Thereby, while being the 60I video signal, a visual effect as of the movie film (24P video signal) can be obtained.

An example of the video conversion by the 2:3:3:2 pull-down system will be described by referring to FIG. 12 and FIG. 13.

FIG. 12 is a video block diagram showing the configuration of a video signal processor which converts the 24P video signal to the 60I video signal. In FIG. 12, reference numeral 71 is an input terminal of the 24P video signal, 72 is an input terminal of a frame synchronizing signal of the 60I video signal, 74, 75 are frame memories, 76 is a frame memory writing/reading-out controller, 77 is a memory output selector, 78 is a pull-down controller and 79 is an output terminal of the 60I video signal.

FIG. 13 is a timing chart of the case where the conversion of the 2:3:3:2 pull-down system is performed using the configuration of FIG. 12. In FIG. 13, reference numeral 81 shows the timing of the frame synchronizing signal of the 24P video signal, 82 shows the timing of the 24P video signal, 83 shows the writing control timing of the frame memory 74, 84 shows the writing control timing of the frame memory 75, 85 shows the timing of the frame synchronizing signal of the 60I video signal, and 86 shows the timing of the 60I video signal.

First, the 24P video signal inputted to the input terminal 71 is written to the frame memories 74, 75, respectively. At this time, the writing/reading-out controller 76 performs writing by switching the writing target (frame memories 74, 75) by each frame of the 24P video signal according to the frame synchronizing signal of the 24P video signal inputted to the input terminal 72. The pull-down controller 78 performs a reading-out control of the frame memories 74, 75 through the writing/reading out controller 76 according to the frame synchronizing signal of the 60I video signal inputted to the input signal 73. Further, the pull-down controller 78 outputs the video signal being read out from the frame memories 74, 75 while making selection by the memory output selector 77. The video signal converted to the 60I video signal is outputted from the memory output selector 77 through the output terminal 79.

This will be described in more details in the followings. In the 24P input video signal 82 of FIG. 13, time-sequence four frames are denoted as A, B, C, D in order. Described is the case where the four frames are converted to the 60I video signals by synchronizing the time base.

First, the 24P input video signal 82 is written to the frame memories 74, 75 according to the frame synchronizing signal 81. That is, the writing control signal 83 for the frame memory 74 and the writing control signal 84 for the frame memory 75 are generated according to the frame synchronizing signal 81. Then, according to the writing control signal 83, the 24P video signal 82 is written to the frame memory 74 when the frame synchronizing signal 81 of the 24P video signal is HIGH. In the meantime, according to the writing control signal 84, the 24P video signal 82 is written to the frame memory 75 when the frame synchronizing signal 81 of the 24P video signal is LOW.

Next, the 60I video signal 86 is generated by reading out the video signals stored in the frame memories 74, 75 in order as described below. That is, in a first frame of the 60I video signal 86, after separating the frame A of the 24P input video signal 82 into a field Ao of an odd-number line and a field Ae of an even number line, the separated fields Ao, Ae are read out as the first frame of the 60I video signal 86.

In a second frame of the 60I video signal 86, after separating the frame B of the 24P input video signal 82 into a field Bo of an odd-number line and a field Be of an even number line, the separated fields Bo, Be are read out as the second frame of the 60I video signal 86.

In a third frame of the 60I video signal 86, while separating the frame B of the 24P input video signal 82 into the field Bo of an odd-number line and the field Be of an even number line, the frame C of the 24P input video signal 82 is separated into a field Co of an odd-number line and a field Ce of an even number-line field. Then, a frame is formed with the separated field Bo and the field Ce to be read out as the third frame of the 60I video signal 86.

In a fourth frame of the 60I video signal 86, after separating the frame C of the 24P input video signal 82 into the field Co of an odd-number line and the field Ce of an even number line, the separated fields Co, Ce are read out as the fourth frame of the 60I video signal 86.

In a fifth frame of the 60I video signal 86, after separating the frame D of the 24P input video signal 82 into a field Do of an odd-number line and a field De of an even number line, the separated fields Do, De are read out as the fifth frame of the 60I video signal 86.

In this manner as described above, for converting the 24P video signal to the 60I video signal, each field of the 24P video signal is read out by being separated into the fields, then the fields of each frame is read out in order under the state where a part of which is overlapped with each other in a repeated cycle, i.e. two fields (Ao:Ae)→three fields (Bo:Be:Bo)→three fields (Ce:Co:Ce)→two fields (Do:De)→ - - - .

In the device configuration shown in FIG. 12, the continuous four frames A-D of the 24P video signal are converted to the 60I video signal by arranging prescribed fields (Bo, Ce in the above-described case) with a part being overlapped with each other. The field arranging cycle of each frame at this time is 2 (no overlapping in the A frame): 3 (overlapping in Bo in the B frame): 3 (overlapping in Ce in the C frame): 2 (no overlapping in the D frame), so that this conversion system is called 2:3:3:2 pull-down system.

There are following problems in the conventional configuration. The 24P video signal is a video format widely used in movie films. The 60I video signal is an example of a standard video format for TV broadcasting. Thus, by converting the 24P video signal to the 60I video signal using the conversion format of the 2:3 pull-down system and the like, it enables to achieve the visual effect, similar to that of the movie film, in the standard displayed picture in TV broadcasting.

Recently, it has been desired to achieve the similar visual effect as that described above in a video system and the like used by amateur video creators. However, in order to achieve the above-described visual effect in the generally-used format of the 60I video signal and the like, the 24P video signal is required as an input video source. In order to obtain the 24P video signal, the filmed video data itself recorded in a film or an image pickup device capable of picking up the 24P video signal becomes necessary.

Moreover, for converting the 24P video signal to the 60I video signal, the format conversion of the 2:3:3:2 pull-down system or the like is performed. However, it requires two frame memories as the structural elements of such format conversion device. Also, writing/reading-out control for the frame memories, especially the reading-out control becomes complicated. Moreover, it requires the timing control (synchronizing the frames) when converting the 24P video signal to the 60I video signal. As described, the format conversion involves an increase in the circuit scale, increase in the cost, and complication of the control.

SUMMARY OF THE INVENTION

Therefore, a main object of the present invention is to provide a video signal processor which can display a picture having the similar visual effect as that of a film on a TV set of NTSC system and a VCR by giving no feeling of wrongness through a simple structure and a control system, without requiring an image which is shot in a film or a video signal formed by a pickup device which picks up an image of the same frame number as that of the film.

The present invention comprises a CCD for storing an inputted image by converting it into an electric charge through photoelectrical conversion to be stored by each field and then outputting the stored electric charge by each field; a shutter pulse generator for supplying a shutter pulse which adjusts storage time of the electric charge in the CCD; and a variable controller for variably controlling adjusting amount of electric charge storage time by the shutter pulse by a field unit.

The present invention comprising the above-described configuration can artificially develop the same visual effect as that of the input source artificially on the output video signal. Thereby, the present invention enables to generate a video signal which can artificially display the visual effect of the film and the like on a TV set of NTSC system and a VCR without giving a feeling wrongness. Moreover, the present invention can achieve such effect by a simple circuit structure and a control system.

BRIEF DESCRIPTION OF THE DRAWINGS

Additional objects and advantages of the present invention will be apparent from the following description of preferred embodiments thereof, which are best understood with reference to the accompanying drawings. One skilled in the art will appreciate that, with the embodiments of the present invention, there are many advantages which are not mentioned in this specification.

FIG. 1 is a block diagram showing the configuration of a video signal processor according to a first embodiment of the present invention;

DETAILED DESCRIPTION OF THE INVENTION

Figure 2:
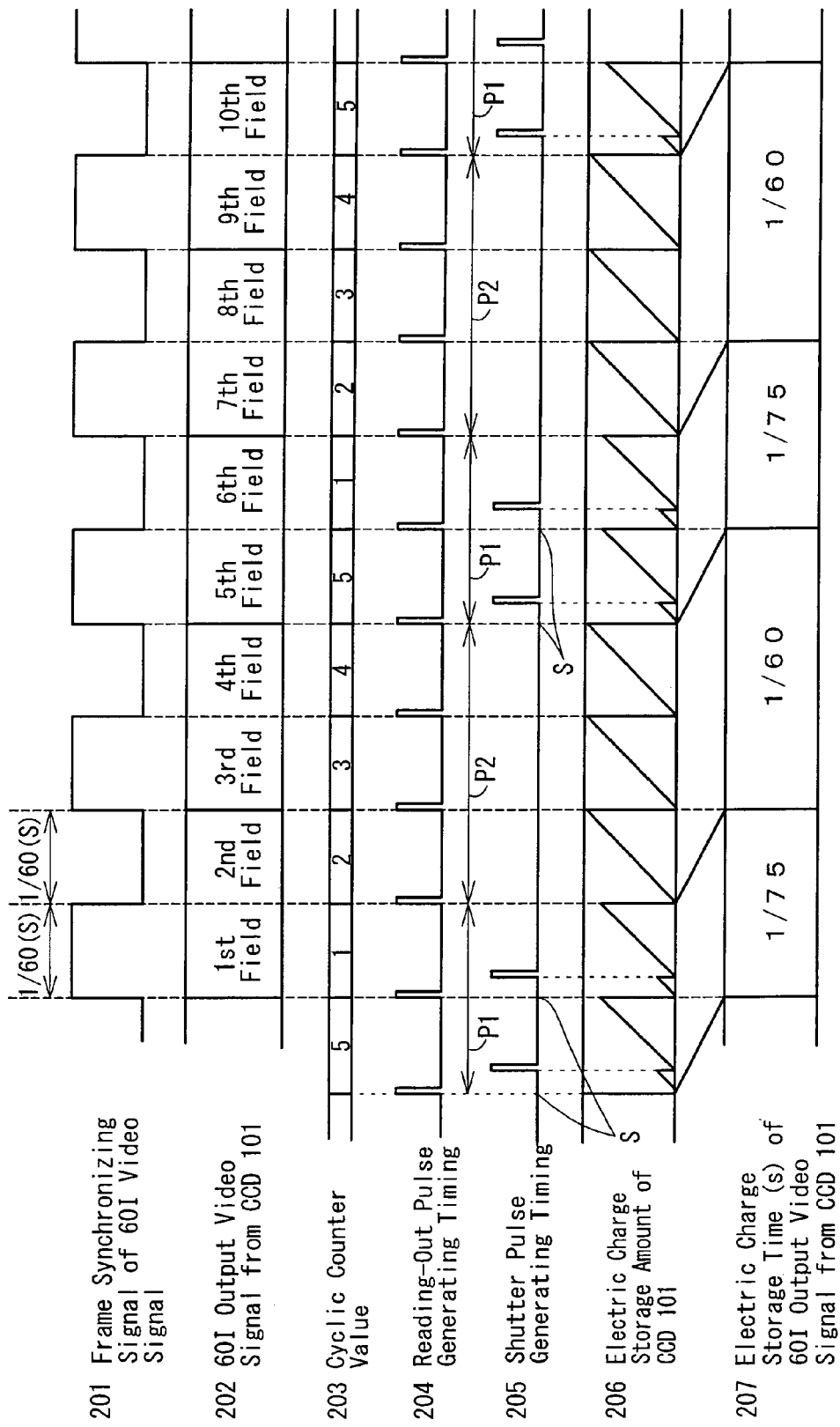
FIG. 2 is a first operation timing chart of the video signal processor according to the first embodiment of the present invention.

In the followings, preferred embodiments of the present invention will be described by referring to the accompanying drawings.

First Embodiment

In the followings, the first embodiment of the present invention will be described by referring to FIG. 1-FIG. 5. FIG. 1 shows the video signal processor of the embodiment. FIG. 2-FIG. 5 are the timing charts for showing the state of video conversion according to the embodiment.

In FIG. 1, reference numeral 101 is a CCD which is an image sensor which performs photoelectrical-conversion on an input image, 102 is a synchronizing signal generator for generating synchronizing signal (1/60 second cycle) for NTSC system, 103 is a pulse generator for generating a pulse for reading out and electric charge stored in the CCD 101 according to the synchronizing signal, 104 is a variable controller for controlling the electric charge storage time of the CCD 101, 105 is a cyclic counter for counting the field number of the video signal, 106 is a first shutter pulse timing generator for setting adjustment value of the electric charge storage time of the CCD 101, 107 is second shutter pulse timing generator for setting adjustment value of the electric charge storage time of the CCD 101, 108 is a switch for switching the shutter pulse timing according to 2:3 pull-down sequence, and 2:3:3:2 pull-down system, etc. and 109 is a shutter pulse generator for generating the shutter pulse according to the shutter pulse timing.

In the timing charts of FIG. 2, etc. used for describing the present invention, numeral reference 201 is a frame synchronizing signal of the 60I video signal, 202 is an output video signal of the CCD 101, 203 shows the cyclic count value outputted from the cyclic counter 105, 204 shows a reading-out pulse (the generating timing) outputted from the control pulse generator 103, 205 shows a shutter pulse (the generating timing) outputted from the shutter pulse generator 109, 206 shows an electric charge storage amount of the CCD 101, and 207 shows the electric charge storage time (second) of the 60I output video signal.

The variable controller 104 is constituted of the cyclic counter 105, the first shutter pulse timing generator 106, the second shutter pulse timing generator 107 and the switch 108.

The first shutter pulse timing generator 106 generates and outputs a timing signal (referred to as a first timing signal T1 hereinafter) for indicating the first generating timing of the shutter pulse 205. The first timing signal T1 is supplied to the shutter pulse generator 109 through the switch 108.

The second shutter pulse timing generator 107 generates and outputs a timing signal (referred to as a second timing signal T2 hereinafter) for indicating the second generating timing of the shutter pulse 205. The second timing signal T2 is supplied to the shutter pulse generator 109 through the switch 108.

The cyclic counter 105 counts the field number of the output video signal 202 in order by calculating the frame synchronizing signal 201 outputted from the synchronizing signal generator 102.

The switch 108 switches the first timing signal T1 (output of the first shutter pulse timing generator 106), the second timing signal T2 (output of the second shutter pulse timing generator 107), and no-output of the timing signal by synchronizing with the frame synchronizing signal 201 for outputting to the shutter pulse generator 109. At this time, the switch 108 performs switching by referring to the field count value outputted from the cyclic counter 105.

The shutter pulse generator 109 generates the shutter pulse 205 in order based on the first, second timing signals T2 and no-output of the timing signal supplied from the switch 108, and outputs it to the CCD 101. At the timing of no-output of the timing signal, the shutter pulse generator 109 does not output the shutter pulse.

In the followings, the operation of the video signal processor according to the embodiment will be described by referring to FIG. 2-FIG. 5. First, described is the control of a case where the visual effect generated when displaying the film image is artificially developed in the 60I video signal at the video conversion cycle of the 2:3 pull-down system.

The visual effect generated when displaying the film image as described above is referred to as the film image effect hereinafter. The video conversion cycle of the 2:3 pull-down system as described above is referred to as 2:3 pull-down cycle hereinafter, and the mode for artificially generating the film image effect in the 60I video signal at the 2:3 pull-down cycle is referred to as a 2:3 pull-down artificial visual effect mode hereinafter.

The shutter speed is fixed to $1/60$ second which is the field cycle in order to effectively achieve the above-described visual effect (flicker) with a less load being applied on the circuit.

When the 2:3 pull-down artificial visual effect mode is performed, the cyclic counter 105 repeats a round count in which the count value is returned to zero by every five fields. Further, the first shutter pulse timing generator 106 outputs the first timing signal T1. The first timing signal T1 generates the pulse after $1/300$ second from the cycle point S by every $1/60$ second in the frame synchronizing signal 201.

Based on such first timing signal T1, the shutter pulse generator 109 generates the shutter pulse 205. In a pulse region of the shutter pulse 205 being generated based on the first timing signal T1, the electric charge storage time of the CCD 101 is $1/75$ second. The operation will be described in detail in the followings.

The synchronizing signal generator 102 generates the frame synchronizing signal 201 in $1/60$ second cycle and supplies it to the variable controller 104, while generating a horizontal/vertical synchronous pulse for supplying it to the control pulse generator 103. The horizontal/vertical synchronous pulse synchronizes with the frame synchronizing signal 201.

The control pulse generator 103 generates the reading-out pulse 204 for reading out the electric charge (image) stored in the CCD 101 and a transfer pulse for outputting the electric charge from the CCD 101. These pulses are generated based on the horizontal/vertical synchronous pulse outputted from the synchronizing signal generator 102. The reading-out pulse 204 is generated by $1/6$ second cycle and the pulse generating timing synchronizes with the pulse rising time and falling time of the frame synchronizing signal 201.

The CCD 101 generates the electric charge (image) by photoelectrical conversion, and transfers the generated electric charge to a transfer buffer (not shown) in the CCD 101 to be stored by synchronizing with the reading-out pulse 204. The CCD 101 transfers the stored electric charge to the transfer buffer so that the amount of stored electric charge returns to the initial state (empty). The electric charge stored in the transfer buffer is outputted from the transfer buffer by a time unit of one field by synchronizing with a vertical/horizontal transfer pulse.

As described, in the 60I video signal, reading-out and transfer of the video signal is performed every $1/60$ second by synchronizing with the frame synchronous pulse 201. In the video signal processor, based on the first timing signal T1 or the second timing signal T2 supplied from the variable controller 104 (specifically, the switch 108), the shutter pulse generator 109 generates the shutter pulse 205 and supplies it to the CCD 101.

The shutter pulse 205 is a storage time adjusting signal which compulsively changes the electric charge storage time of the CCD 101. Specifically, the shutter pulse 205 is a signal which gives a command to compulsively discharge the electric charge stored in the CCD 101 to a substrate potential (ground potential) without transferring it to the transfer buffer. Therefore, in each field time unit, the electric charge is stored in the CCD 101 only during the time length from the output of the pulse 205 to the completion of the field time unit.

The pulse region of the shutter pulse 205 (referred to as a first pulse region P1 hereinafter) being generated based on the first timing signal T1 is pulse-set aiming to give the visual effect (flicker) to the output image. The first pulse region P1 is set by corresponding to the shutter speed (exposure time) of the video signal processor (CCD 101).

Specifically, the first pulse region P1 is pulse-set so that the electric charge storage time becomes the time length which is obtained by increasing/decreasing the time length of the shutter speed. That is, when the shutter speed is set as $1/60$ second, for example, the pulse is generated in the first pulse region P1 after $1/300$ second from each cycle point S by the field time unit ($1/60$ second) in the frame synchronizing signal 201. Thereby, at the generating timing of the first pulse region P1 in the shutter pulse 205, the electric charge storage time of the CCD 101 becomes $1/60$ second-$1/300$ second=$4/300$ second=$1/75$ second. Each pulse in the first pulse region P1 is constituted of short pulse with remarkably narrower pulse width than that of the frame synchronizing signal 201.

The pulse region of the shutter pulse 205 (referred to as a second pulse region P2 hereinafter) being generated based on the second timing signal T2 is pulse-set so that the electric charge storage time of the CCD 101 becomes the time length which corresponds to the shutter speed (exposure time) of the video signal processor (CCD 101). The longest set time of the shutter speed is set to be 1/60 second (in the case of 60I video signal), which is the field time unit, and the shortest time is set as the shortest exposure time (1/100 second, etc) which is set as achievable with the mechanism of the device. For example, when the shutter speed is set as 1/360 second, the pulse is generated in the second pulse region P2 after 5/360 second from each cycle point S by the field time unit (1/60 second) in the frame synchronizing signal 201. Thereby, at the generating timing of the second pulse region P2 in the shutter pulse 205, the electric charge storage time of the CCD 101 becomes 1/60 second-5/360 second=1/360 second. This is the same as the shutter speed. Each pulse in the second pulse region P2 is constituted of short pulse with remarkably narrower pulse width than that of the frame synchronizing signal 201.

The shutter pulse 205 is in a configuration in which the first, second shutter pulse regions P1, P2 being set as described are alternately arranged on the time base under the state where each region is corresponded to the continuous plural fields.

When the shutter speed is fixed to be 1/60 second, which is the field cycle of the 60I video signal, the pulse cycle in the second pulse region P2 in the shutter pulse 205 synchronizes with the reading-out pulse 204 also at the same cycle. When the stored electric charge of the CCD 101 is transferred to the transfer buffer based on the reading-out pulse 204, the electric charge of the CCD 101 returns to the initial state (empty). Thus, in the state where the shutter speed is fixed to be 1/60 second, the reading-out pulse 204 can execute the function of the second pulse region P2 in the shutter pulse 205 instead.

According to this view point, the shutter pulse timing generator 107 may or may not output the second timing signal T2 when the shutter speed is fixed to be 1/60 second. When the second timing signal T2 is not outputted, the load on the circuit can be lightened. In the following, described is the control of the case where the second timing signal T2 is not outputted.

The first shutter pulse timing generator 106 generates the first timing signal T1 by which the electric charge storage time becomes 1/75 second and outputs it to the switch 108. Specifically, the first timing signal T1 is a timing signal for giving a command to generate the shutter pulse 205 after 1/300 second from the cycle point S by every 1/60 second in the frame synchronizing signal 201.

In the video signal processor, the second shutter pulse timing generator 107 does not generate the second timing signal T2. However, the second shutter pulse timing generator 107 may generate the second timing signal T2 by which the electric charge storage time in the CCD 101 becomes 1/60 second and output it to the switch 108.

The cyclic counter 105 supplies the count value which is counted up at the rise and fall edges of the frame synchronizing signal 201 of the 60I video signal of FIG. 2 and rounds at five fields to the switch 108. The switch 108, according to the 2:3 pull-down sequence, selects the first timing signal T1 (output of the first shutter pulse timing generator 106) and outputs it to the shutter pulse generator 109 in the timing where the count values of the cyclic counter 105 are "5", "1". At the timing where the count values are "2", "3", "4", the switch 108 selects the non-output of the timing signal and does not output the timing signal to the shutter pulse generator 109.

In the case where the second shutter pulse timing generator 107 generates the second timing signal by which the electric charge storage time of the CCD 101 becomes 1/60 second, the switch 108 selects the second timing signal T2 (output of the second shutter pulse timing generator 107) and outputs it to the shutter pulse generator 109 at the timing where the count values are "2", "3", "4".

The shutter pulse generator 109 generates the shutter pulse 205 and outputs it to the CCD 101 according to the first, second timing signals T1, T2 (in this case, the first timing signal T1 and non-output of the timing signal) supplied from the variable controller 104. Specifically, at the timing where the count values of the cyclic counter 105 are "5", "1", the pulse rises after 1/300 second from the cycle point S by every 1/60 second of the frame synchronizing signal 201. In the meantime, at other timing, the shutter pulse 205 in a signal form in which the pulse does not rise at all is generated to be supplied to the CCD 101. The shutter pulse 205 supplied to the CCD 101 is in a signal structure where the first, second shutter pulse regions P1, P2 respectively corresponded to the continuous plural fields are alternately arranged on the time base.

As described, the variable controller 104 for controlling the shutter pulse generator 109 controls the shutter pulse periodically by a unit of the continuous five fields. The controller 104 sets the first shutter pulse (the first pulse region P1) in the (1×n), (2×n) fields positioned in the first, second places in the unit of the five fields, while setting the second shutter pulse (the second pulse region P2) in the (3×n), (4×n) (5×n) fields positioned in the third, fourth, fifth places in the unit of the five fields. The aforementioned "n" is a natural number.

In the CCD 101 to which the shutter pulse 205 having such pulse form is supplied, the electric charge after being stored for 1/75 second which is shorter than 1/60 second as the time length of the field is outputted in the fields where the cyclic count value 203 shows "1", "5" (the first, second, sixth, seventh, - - - fields of the output video signal 202). Also, in the fields where the cyclic count value 203 shows "2", "3", "4" (the third-fifth, the eighth-tenth, - - - fields of the output video signal 202), the electric charge after being stored for 1/60 second which is equivalent to the time length of the field is outputted.

Thereby, in the output video signal 202, there is a difference between the luminance of the image of the first, second fields and that of the third-fifth fields. As a result, the film image effect (flicker) is artificially developed in the 60I video signal at the 2:3 pull-down cycle.

Next, described is the control of the case where the film image effect is artificially developed in the 60I video signal at the video conversion cycle of the 2:3:3:2 pull-down system under the state where the shutter speed is fixed to be 1/60 second which is the field cycle. The video conversion cycle of the 2:3:3:2 pull-down system as described above is referred to as 2:3:3:2 pull-down cycle hereinafter, and the mode for artificially generating the film image effect in the 60I video signal at the 2:3:3:2 pull-down cycle is referred to as a 2:3:3:2 pull-down artificial visual effect mode hereinafter.

At the time of performing the 2:3:3:2 pull-down artificial visual effect mode, the cyclic counter 105 repeats the round count in which the count value is returned to zero by every ten fields. The first, second timing signals T1, T2 generated in the first, second shutter pulse timing generators 106, 107 are the same as the case where the 2:3 pull-down system artificial visual effect mode is performed. In the followings, the distinctive features of this mode, which are different from the case of performing the 2:3 pull-down system artificial visual effect mode, will be described.

Figure 3:
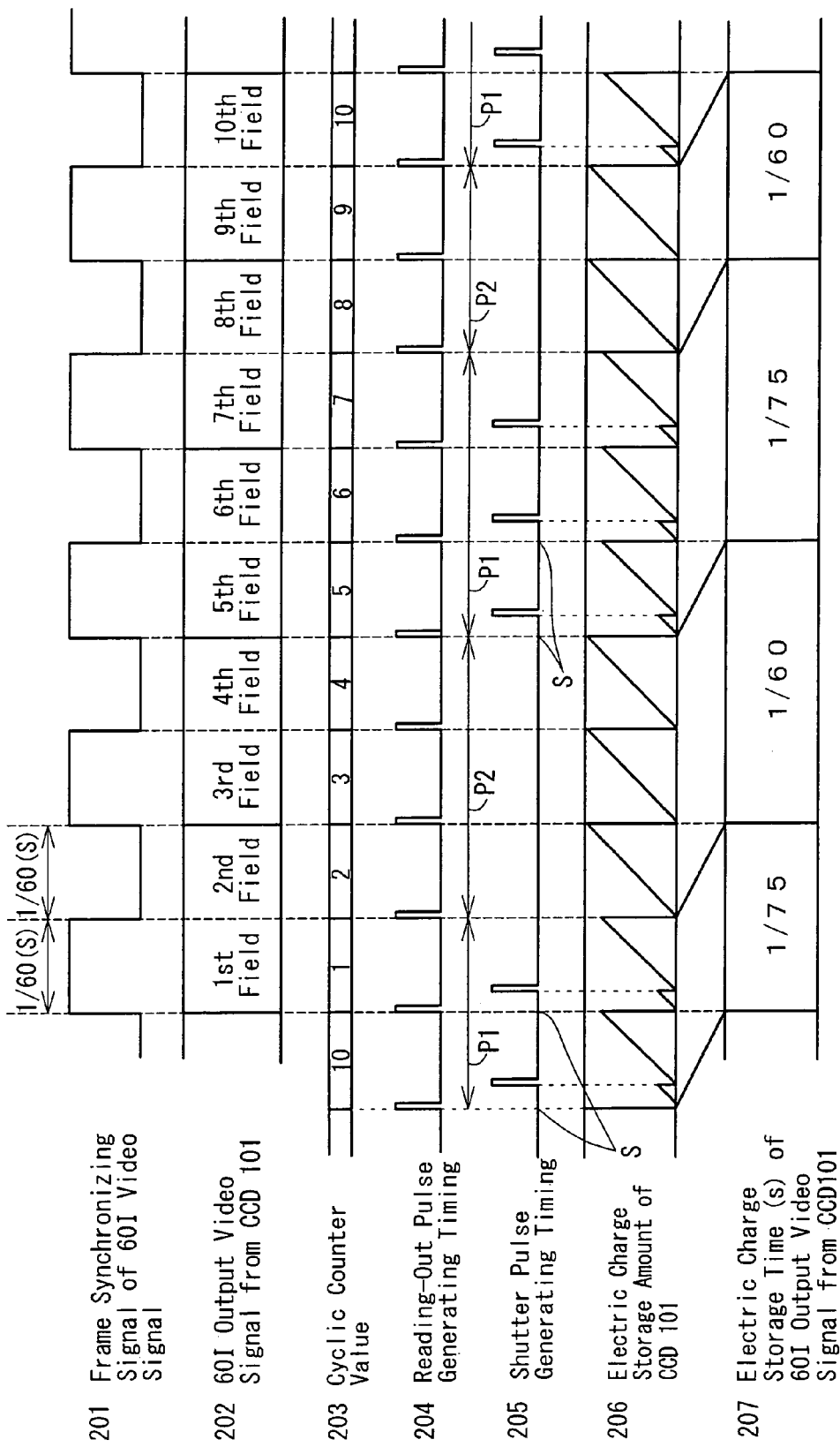
FIG. 3 is a second operation timing chart of the video signal processor according to the first embodiment of the present invention.
Figure 4:
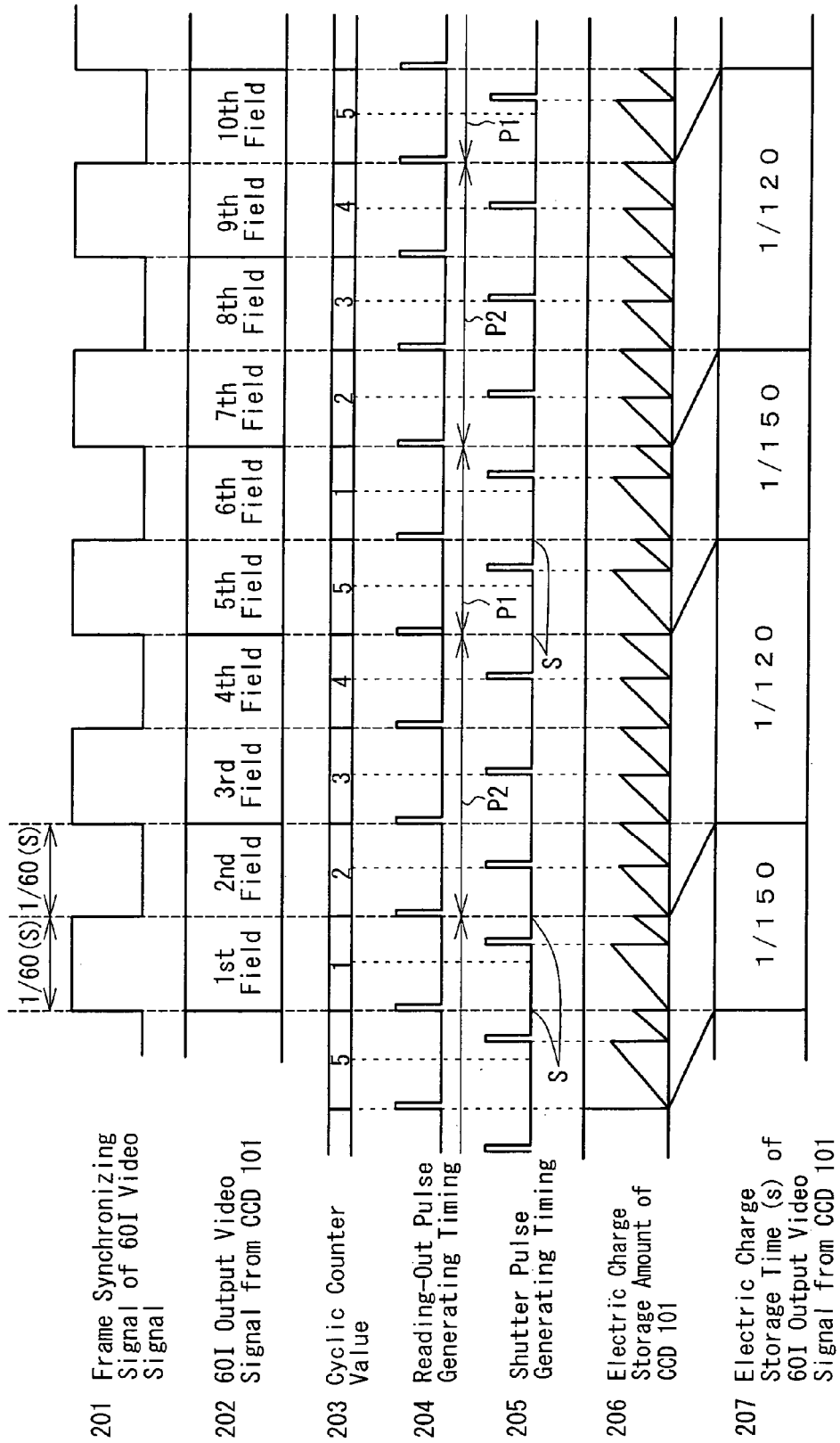
FIG. 4 is a third operation timing chart of the video signal processor according to the first embodiment of the present invention.

The cyclic counter 105 supplies the count value, which is counted up at the rise and fall edges of the frame synchronizing signal 201 of the 60I video signal of FIG. 3 and rounds at ten fields, to the switch 108. The switch 108, according to the 2:3:3:2 pull-down sequence, selects the first timing signal T1 (output of the first shutter pulse timing generator 106) and outputs it to the shutter pulse generator 109 of the timing where the count values of the cyclic counter 105 are "10", "1", "5", "6", "7". In the meantime, at the timing where the count values are "2", "3", "4", "8", "9", the switch 108 selects the non-output of the timing signal and does not output the timing signal to the shutter pulse generator 109.

In the case where the second shutter pulse timing generator 107 generates the second timing signal by which the electric charge storage time of the CCD 101 becomes $1/60$ second, the switch 108 selects the second timing signal T2 (output of the second shutter pulse timing generator 107) and outputs it to the shutter pulse generator 109 at the timing where the count values are "2", "3", "4", "8", "9".

The shutter pulse generator 109 generates the shutter pulse 205 and outputs it to the CCD 101 according to the timing signals (in this case, the first timing signal T1) supplied from the variable controller 104. Specifically, at the timing where the count values of the cyclic counter 105 are "10", "1", "5", "6", "7", the pulse rises after $1/300$ second from the cycle point S by every $1/60$ second of the frame synchronizing signal 201. In the meantime, at other timing, the shutter pulse 205 in a signal form in which the pulse does not rise at all is generated to be supplied to the CCD 101. The shutter pulse 205 supplied to the CCD 101 is in a signal structure where the first, second shutter pulse regions P1, P2 respectively corresponded to the continuous plural fields are alternately arranged on the time base.

As described, the variable controller 104 for controlling the shutter pulse generator 109 controls the shutter pulse periodically by a unit of the continuous ten fields. The controller 104 sets the first shutter pulse (the first pulse region P1) in the (1×n), (2×n), (6×n), (7×n), (8×n) fields positioned in the first, second, sixth, seventh, eighth places in the unit of the ten fields, while setting the second shutter pulse (the second pulse region P2) in the (3×n), (4×n), (5×n), (9×n), (10×n) fields positioned in the third, fourth, fifth, ninth, tenth places in the unit of the ten fields. The aforementioned "n" is a natural number.

In the CCD 101 to which the shutter pulse 205 having such pulse form is supplied, the electric charge after being stored for $1/75$ second is outputted in the fields where the cyclic count value 203 shows "1", "5", "6", "7", "10" (the first, second, sixth, seventh, eighth - - - fields of the output video signal 202). Also, in the fields where the cyclic count value 203 shows "2", "3", "4", "8", "9" (the third-fifth, the ninth, tenth - - - fields of the output video signal), the electric charge after being stored for $1/60$ second is outputted.

Thereby, in the output video signal 202, there is a difference between the luminance of the image of the first, second, sixth-eighth fields and that of the third-fifth, the ninth, tenth fields. As a result, the film image effect (flicker) is artificially developed in the 60I video signal at the 2:3:3:2 pull-down cycle.

Next, described is the control of the case where the 2:3 pull-down artificial visual effect mode is performed under the state where the shutter speed is fixed to be $1/120$ second.

When the 2:3 pull-down artificial visual effect mode is performed, as described above, the cyclic counter 105 repeats a round count in which the count value is returned to zero by every five fields. In the followings, described is the difference between the case of performing the 2:3 pull-down artificial visual effect mode under the state where the shutter speed is set as $1/120$ second, and performing the same mode under the state where the shutter speed is set as $1/60$ second.

When the shutter speed is set as $1/120$ second, in the first pulse region P1, the pulse is generated after $1/100$ second from the cycle point S by every $1/60$ second in the frame synchronizing signal 201. Thus, at the generation timing of the first pulse region P1 in the shutter pulse 205, the electric charge storage time of the CCD 101 becomes $1/60$ second-$1/100$ second=$2/300$ second=$1/150$ second.

When the shutter speed is set as $1/120$ second, in the second pulse region P2, the pulse is generated after $1/120$ second from the cycle point S by every $1/60$ second in the frame synchronizing signal 201. Thus, at the generation timing of the second pulse region P2 in the shutter pulse 205, the electric charge storage time of the CCD 101 becomes $1/60$ second-$1/120$ second=$1/120$, which is equivalent to the shutter speed.

The first shutter pulse timing generator 106 generates the first timing signal T1 ($1/100$ second) by which the electric charge storage time becomes $1/150$ second and outputs it to the switch 108. Specifically, the first timing signal T1 is a timing signal for giving a command to generate the shutter pulse 205 after $1/100$ second from the cycle point S by every $1/60$ second in the frame synchronizing signal 201.

The second shutter pulse timing generator 107 generates the second timing signal T2 by which the electric charge storage time becomes $1/120$ second and outputs it to the switch 108. Specifically, the second timing signal T2 is a timing signal for giving a command to generate the shutter pulse 205 after $1/120$ second from the cycle point S by every $1/60$ second in the frame synchronizing signal 201.

The cyclic counter 105 supplies the count value which is counted up at the rise and fall edges of the frame synchronizing signal 201 of the 60I video signal of FIG. 2 to the switch 108. The switch 108, according to the 2:3 pull-down sequence, selects the first timing signal T1 (output of the first shutter pulse timing generator 106) and outputs it to the shutter pulse generator 109 of the timing where the count values of the cyclic counter 105 are "5", "1". At the timing where the count values are "2", "3", "4", the switch 108 selects the second timing signal T2 (output of the second shutter pulse timing generator 107) and outputs it to the shutter pulse generator 109.

The shutter pulse generator 109 generates the shutter pulse 205 and outputs it to the CCD 101 according to the timing signals (the first timing signal T1 or the second timing signal T2) supplied from the variable controller 104. Specifically, at the timing where the count values of the cyclic counter 105 are "1", "5", the pulse rises after $1/100$ second from the cycle point S by every $1/60$ second of the frame synchronizing signal 201. In the meantime, at the timing where the count values of the cyclic counter 105 are "2", "3", "4", the shutter pulse 205 in which the pulse rises after $1/120$ second from the cycle point S by every $1/60$ second of the frame synchronizing signal 201 is generated to be supplied to the CCD 101. The shutter pulse 205 supplied to the CCD 101 is in a signal structure where the first, second shutter pulse regions P1, P2 respectively corresponded to the continuous plural fields are alternately arranged on the time base.

As described, the variable controller 104 for controlling the shutter pulse generator 109 controls the shutter pulse periodically by a unit of the continuous five fields. The controller 104 sets the first shutter pulse (the first pulse region P1) in the (1×n), (2×n) fields positioned in the first, second places in the unit of the five fields, while setting the second shutter pulse (the second pulse region P2) in the (3×n), (4×n) (5×n) fields positioned in the third, fourth, fifth places in the unit of the five fields. The aforementioned "n" is a natural number.

In the CCD 101 to which the shutter pulse 205 having such pulse form is supplied, the electric charge after being stored $1/150$ second is outputted in the fields where the cyclic count value 203 shows "1", "5" (the first, second fields of the output video signal 202). Also, in the fields where the cyclic count value 203 shows "2", "3", "4" (the third-fifth, - - - fields of the output video signal 202), the electric charge after being stored for $1/120$ second is outputted.

Thereby, in the output video signal 202, there is a difference generated between the luminance of the image of the first, second fields and that of the third-fifth fields. As a result, the film image effect (flicker) is artificially developed in the 60I video signal at the 2:3 pull-down cycle.

Next, described is the control of the case where the 2:3:3:2 pull-down artificial visual effect mode is performed under the state where the shutter speed is fixed to be $1/120$ second which is the fields cycle.

At the time of performing the 2:3:3:2 pull-down artificial visual effect mode, as described above, the cyclic counter 105 repeats the round count in which the count value is returned to zero by every ten fields. In the followings, the distinctive features of this mode, which are different from the case of performing the 2:3 pull-down system artificial visual effect mode with the shutter pulse speed being set as $1/120$ second, will be described.

Figure 5:
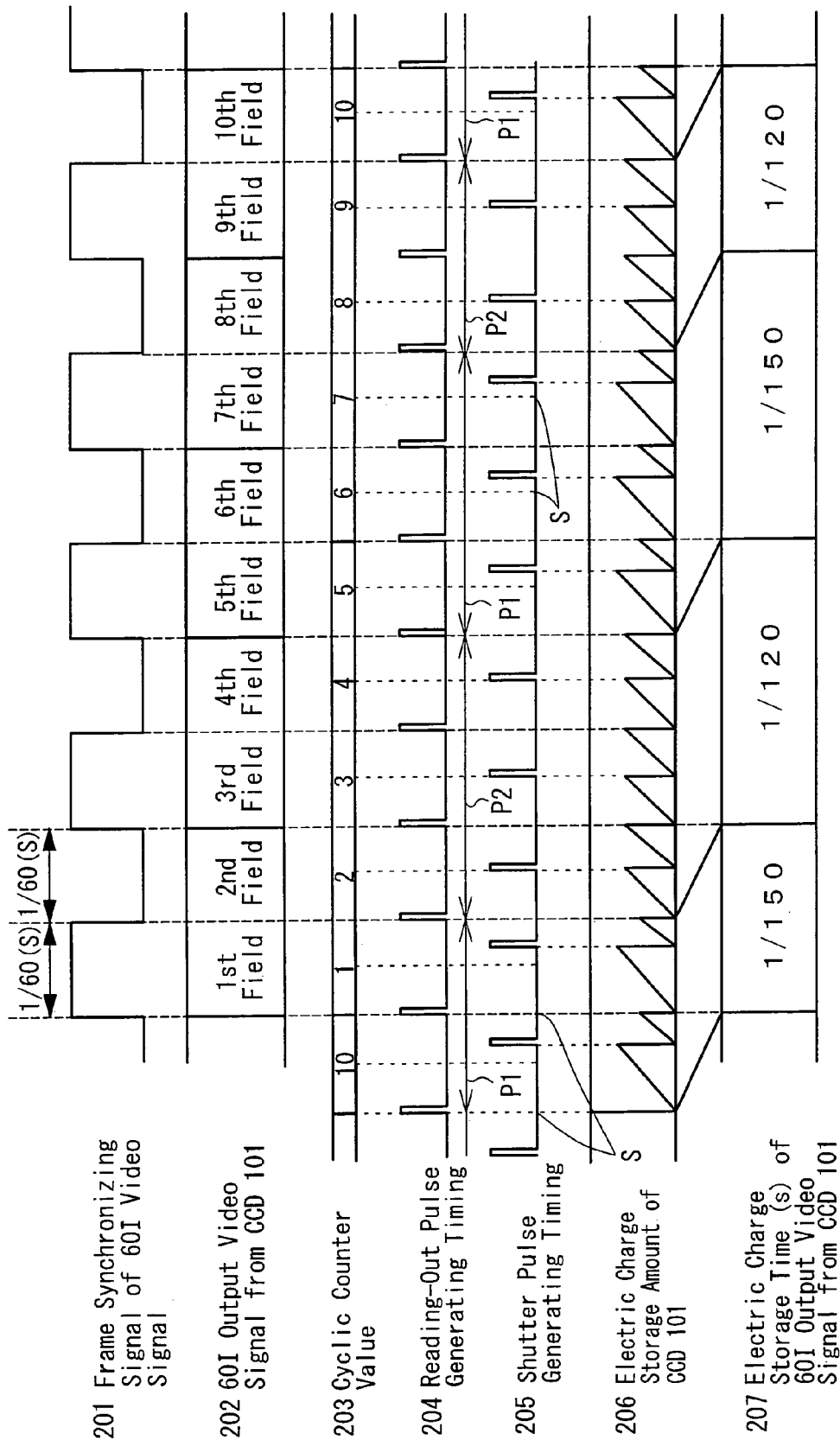
FIG. 5 is a fourth operation timing chart of the video signal processor according to the first embodiment of the present invention.

The cyclic counter 105 supplies the count value, which is counted up at the rise and fall edges of the frame synchronizing signal 201 of the 60I video signal of FIG. 5 and rounds at ten fields, to the switch 108. The switch 108, according to the 2:3:3:2 pull-down sequence, selects the first timing signal T1 (output of the first shutter pulse timing generator 106) and outputs it to the shutter pulse generator 109 at the timing where the count values of the cyclic counter 105 are "10", "1", "5", "6", "7". In the meantime, at the timing where the count values are "2", "3", "4", "8", "9", the switch 108 selects the second timing signal T2 (output of the second shutter pulse timing generator 107) and outputs it to the shutter pulse generator 109.

The shutter pulse generator 109 generates the shutter pulse 205 and outputs it to the CCD 101 according to the timing signals (the first timing signal T1 or the second timing signal T2) supplied from the variable controller 104. Specifically, at the timing where the count values of the cyclic counter 105 are "10", "1", "5", "6", "7", the pulse rises after $1/100$ second from the cycle point S by every $1/60$ second of the frame synchronizing signal 201. In the meantime, at the timing where the count values of the cyclic counter 105 are "2", "3", "4", "8", "9", the shutter pulse 205 in which the pulse rises after $1/120$ second from the cycle point S by every $1/60$ second of the frame synchronizing signal 201 is generated to be supplied to the CCD 101. The shutter pulse 205 supplied to the CCD 101 is in a signal structure where the first, second shutter pulse regions P1, P2 respectively corresponded to the continuous plural fields are alternately arranged on the time base.

As described, the variable controller 104 for controlling the shutter pulse generator 109 controls the shutter pulse periodically by a unit of the ten continuous fields. The controller 104 sets the first shutter pulse (the first pulse region P1) in the (1×n), (2×n), (6×n), (7×n), (8×n) fields positioned in the first, second, sixth, seventh, eighth places in the unit of the ten fields, while setting the second shutter pulse (the second pulse region P2) in the (3×n), (4×n), (5×n), (9×n), (10×n) fields positioned in the third, fourth, fifth, ninth, tenth places in the unit of the five fields. The aforementioned "n" is a natural number.

In the CCD 101 to which the shutter pulse 205 having such pulse form, the electric charge after being stored for $1/150$ second is outputted in the fields where the cyclic count value 203 shows "1", "5", "6", "7", "10" (the first, second, sixth, seventh, eighth - - - fields of the output video signal 202). Also, in the fields where the cyclic count value 203 shows "2", "3", "4", "8", "9" (the third-fifth, the ninth, tenth - - - fields of the output video signal), the electric charge after being stored for $1/120$ second is outputted.

Thereby, in the output video signal 202, there is a difference generated between the luminance of the image of the first, second, sixth-eighth fields and that of the third-fifth, the ninth, tenth fields. As a result, the film image effect (flicker) is artificially developed in the 60I video signal at the 2:3:3:2 pull-down cycle.

Second Embodiment

Figure 6:
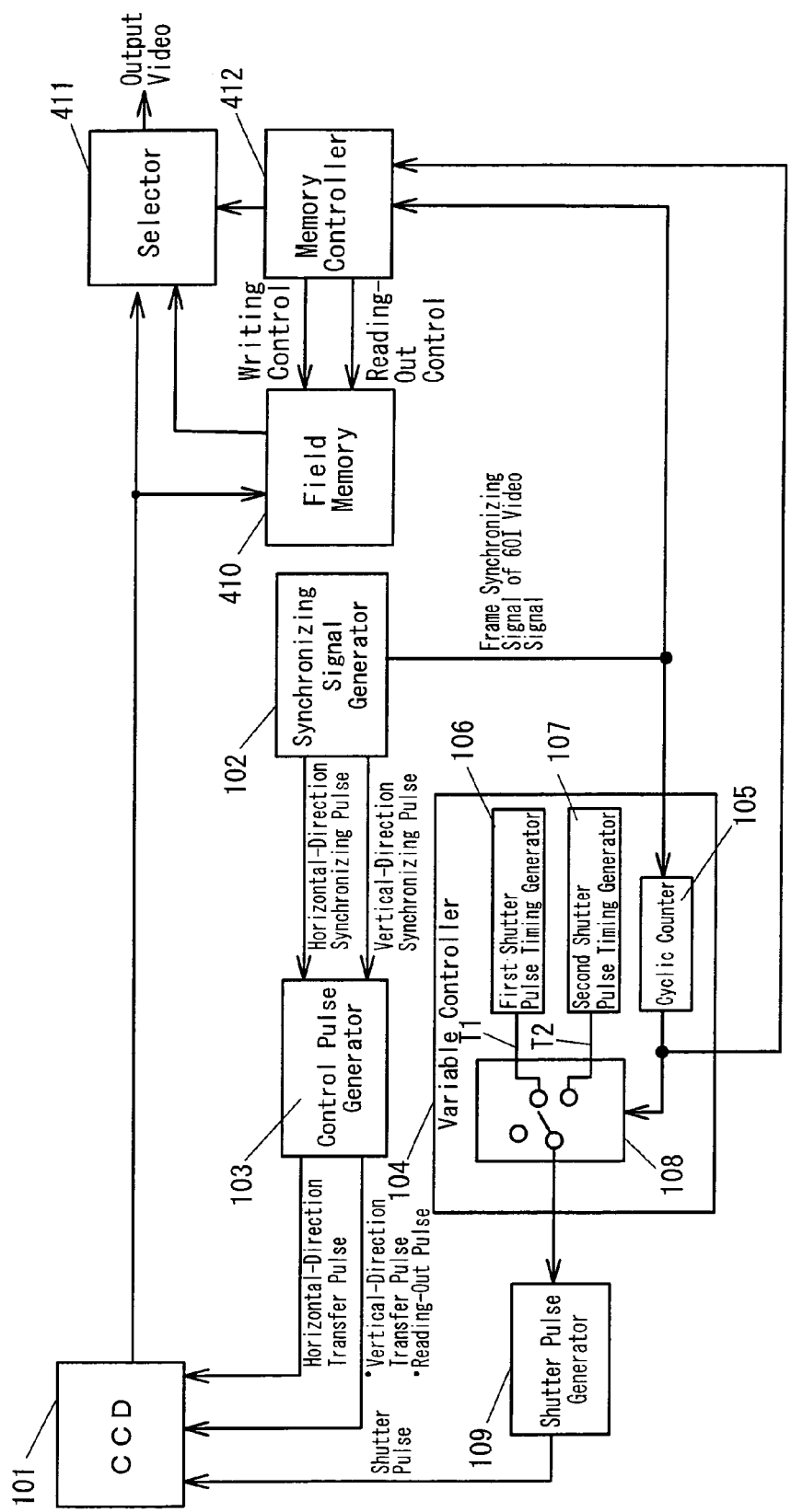
FIG. 6 is a block diagram showing the configuration of a video signal processor according to a second embodiment of the present invention.
Figure 7:
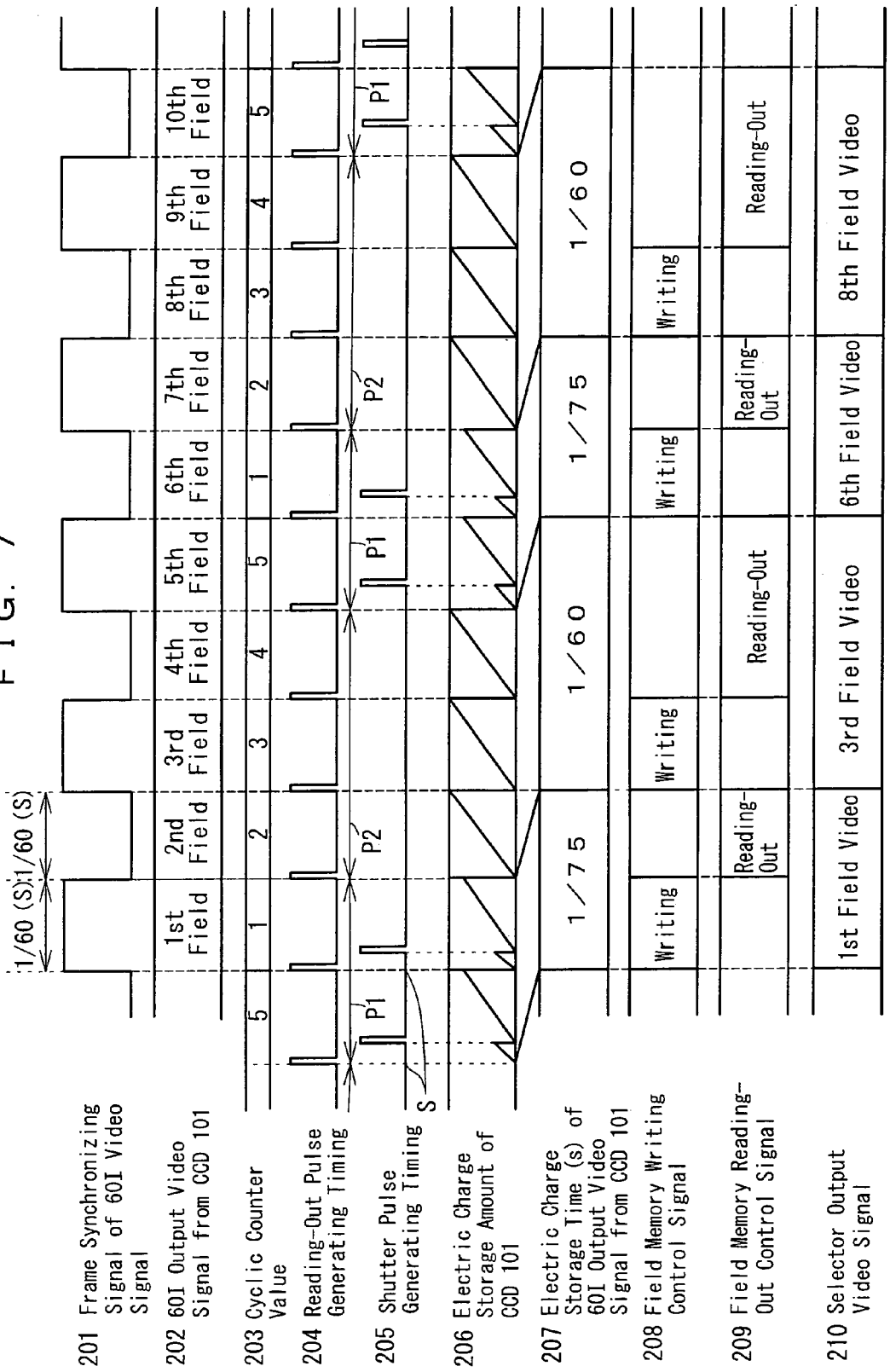
FIG. 7 is a first operation timing chart of the video signal processor according to the second embodiment of the present invention.
Figure 8:
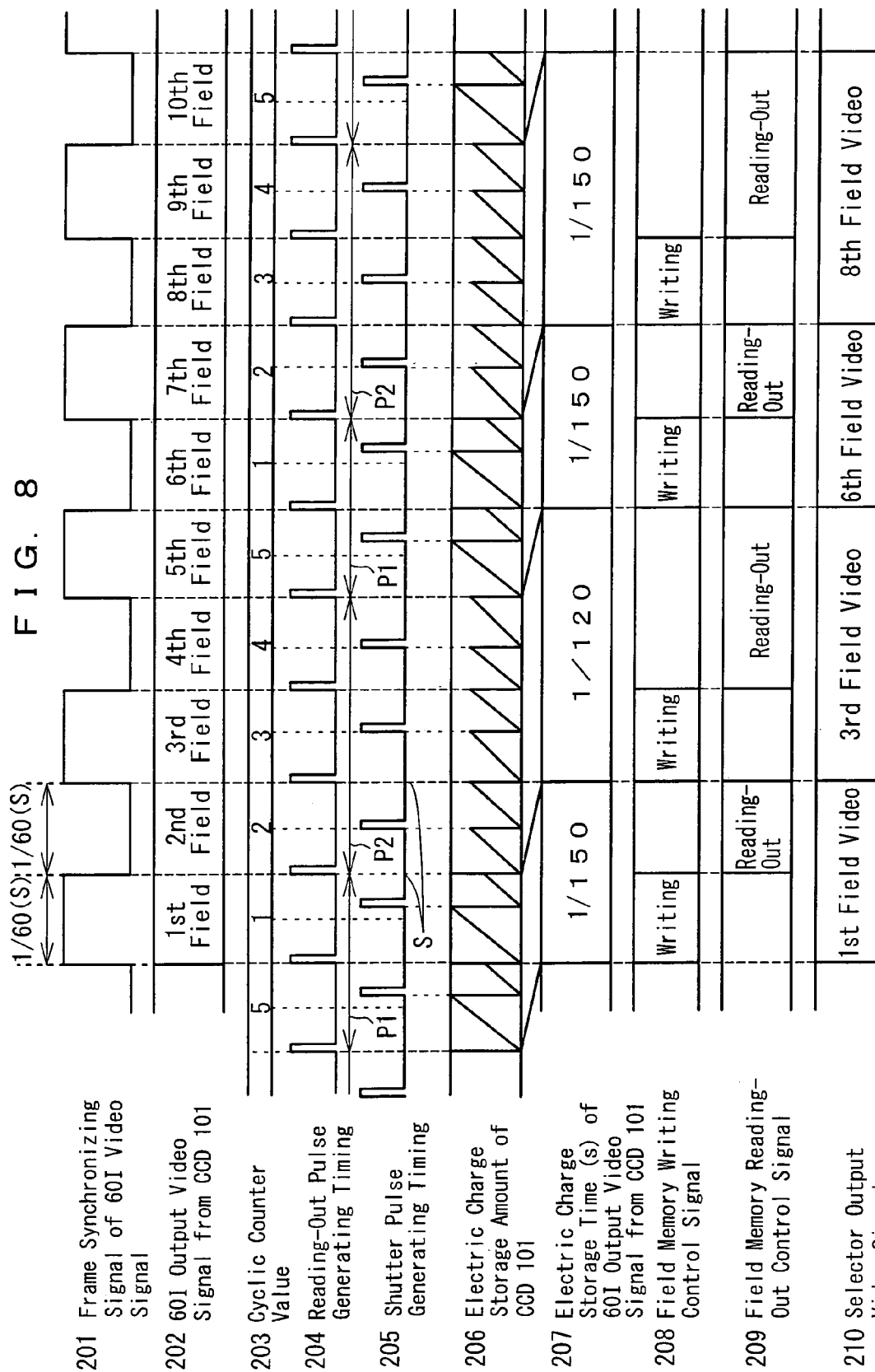
FIG. 8 is a second operation timing chart of the video signal processor according to the second embodiment of the present invention.

FIG. 6 is an illustration showing a video signal processor according to a second embodiment of the present invention. FIG. 7 is a timing chart showing the state of video conversion corresponding to the 2:3 pull-down conversion system and FIG. 8 is a timing chart showing the state of video conversion corresponding to the 2:3:3:2 pull-down conversion system.

In FIG. 6, the components to which the same reference numeral as those of FIG. 1 are applied have basically the same structures as those of the first embodiment, so that the description thereof will be omitted. The video signal processor of this embodiment is distinctive in respect that it comprises a field memory 410, a selector 411 and a memory controller 412.

FIG. 7-FIG. 10 are timing charts showing the operations of the video signal processor of the second embodiment. In these figures, reference numeral 208 shows the writing control timing of the field memory 410, 209 shows the reading-out control timing of the field memory 410, and 210 shows the timing of the output video signal of the selector. Other timing is basically the same as that of the first embodiment. Thus, in FIG. 7-FIG. 10, same reference numerals are applied to the parts showing the same timing of FIG. 2-FIG. 5.

In the followings, the control operation performed by the video signal processor will be described. First, by referring to FIG. 7, described is a control operation for giving an artificial visual effect similar to that of the 2:3 pull-down system conversion. In this embodiment, the control operation performed by the variable controller 104 for giving the artificial visual effect similar to that of the 2:3 pull-down system conversion is basically the same as that performed by the variable controller 104 in the configuration of the first embodiment. Thus, the description of the control operation performed by the variable controller 104 is omitted here.

In the followings, described are the control operations of the memory controller 412, the selector 411, and the field memory 410 which are the distinctive features of the embodiment.

In the video signal processor, the output video signal 202 outputted from the CCD 101 is inputted to the field memory 410 and the selector 411, and the frame synchronizing signal 201 outputted from the synchronizing signal generator 102 is inputted to the memory controller 412. The output video signal 202 and the frame synchronizing signal 201 synchronize with each other as shown in FIG. 7 and, further, are inputted by completely the same cycle. Also, the frame synchronizing signal 201 inverts by every 60 Hz cycle (1/60 second) of the NTSC system.

The frame synchronizing signal 201 is inputted to the memory controller 412 and the variable controller 104. The memory controller 412 and the variable controller 104 perform the control operations according to the frame synchronizing signal 201.

The selector 411 selects and outputs either the output video signal 202 or the reading-out output of the field memory 410. The memory controller 412 performs the controls of writing and reading-out to/from the field memory 410. Further, the memory controller 412 controls the selecting operation of the selector 411.

Specifically, the memory controller 412 performs, for example, the following control of the selecting operation. In the memory controller 412, the count value is inputted from the cyclic counter 105.

The count values of the cyclic counter 105 indicating the writing field of the field memory 410 are set beforehand and the memory controller 412 stores the set count values to be written. In the case of adding the artificial visual effect similar to that of the 2:3 pull-down system, the count values to be written are "1", "3".

The memory controller 412 outputs an execution command to the field memory 410 for writing the output video signal 202 at the timing where the count values of the output video signal 202 supplied by the cyclic counter 105 are the count values indicating the field to be written. The execution command for writing the output video signal 202 is supplied to the field memory 410 as a field memory writing control signal 208 as shown in FIG. 7.

The count values of the cyclic counter 105 indicating the reading-out timing from the field memory 410 are set beforehand and the memory controller 412 stores the set count values of the reading-out timing. In the case of adding the artificial visual effect similar to that of the 2:3 pull-down system, the count values of the reading-out timing are "2", "4", "5".

The memory controller 412 outputs an execution command for reading out to the field memory 410 at the timing where the count values of the output video signal 202 supplied by the cyclic counter 105 corresponds to the count values of the reading-out timing. The execution command for reading-out is supplied to the field memory 410 as a field memory reading-out control signal 209 as shown in FIG. 7.

In the case where the film image effect is artificially supplied at the 2:3 pull-down cycle, for example, the memory controller 412 gives a writing command of the output video signal 202 to the field memory 410 at the timing where the count values of the cyclic counter 105 are "1", "3". In the meantime, the memory controller 412 gives a reading-out command to the field memory 410 at the timing where the count values of the cyclic counter 105 are "2", "4", "5".

The output selection by the selector 411 is controlled by the count values of the cyclic counter 105. The interaction between the selector 411 and the operation of the output selection is set beforehand and the memory controller 412 stores the pre-set interaction.

In the selector 411, the output video signal 202 and the reading-out output of the field memory 410 are inputted. The memory controller 412 controls the selector 411 according to the field count values of the output video signal 202 supplied by the cyclic counter 105. Specifically, the memory controller 412 controls the selector 411 so that the output video signal 202 and the reading-out output of the field memory 410 are switched to be outputted.

When artificially supplying the film image effect at the 2:3 pull-down cycle, the above-described interaction stored in the selector 411 is as follows. That is, when the count values are "1", "3", the selector 411 selects the output video signal 202 of the CCD 101 and, when the count values are "2", "4", "5", selects the reading-out output of the field memory 410.

Thus, at the timing of executing the writing to the field memory 410 (the timing when the count values of the cyclic counter 105 are "1", "3"), the selector 411 selects and output the output video signal 202 of the CCD 101. In the meantime, at the timing of executing the reading-out from the field memory 410 (the timing when the count values of the cyclic counter 105 are "2", "4", "5"), the selector 411 selects and output the reading-out output of the field memory 410. Thereby, the selector 411 repeatedly outputs the 60I video signal in which the writing is executed to the field memory 410 as shown by selector output video signal 210 of FIG. 7 until the next writing is executed.

Thereby, in the selector output video signal 210, the control is carried out for repeating the processing of continuously outputting the video signals of the two continuous (1×n)–(2×n) fields of the five continuous (1×n–(5×n) fields and the processing the video signals of the three continuous (3×n)–(5×n) fields. The "n" is a natural number.

Therefore, in the selector output video signal 210 outputted from the selector 411, image changes (change in the motion of the object being taken) by every twenty-four frames resembling the 24P video signal are generated. Moreover, in the selector output video signal 210, image changes (change in the luminance) by every twenty-four frames resembling the film image is generated at the 2:3 pull-down cycle.

Because of the above-described reasons, the film image effect (flicker) is artificially added to the selector output video signal 210 with high-precision.

When performing the embodiment under the state where the film image effect (flicker) is artificially generated at the 2:3 pull-down cycle, it is performed by fixing the shutter speed not only to 1/60 second as described by referring to FIG. 7 but also under the state where the shutter speed is set arbitrarily. FIG. 8 shows the configuration for performing the embodiment in the case where the shutter speed is set as 1/120 second and the storage time is set as 1/150 second in the field of the variable electric charge storage time. In this case, the variable control of the electric charge storage time is the same as that described above by referring to FIG. 5. In the form of the control shown in FIG. 8, the control operations by the field memory 410, the selector 411 and the memory controller 412 are the same as those described above by referring to FIG. 7. As shown in this example, the embodiment can be performed under the state where the shutter speed is set arbitrarily.

Figure 9:
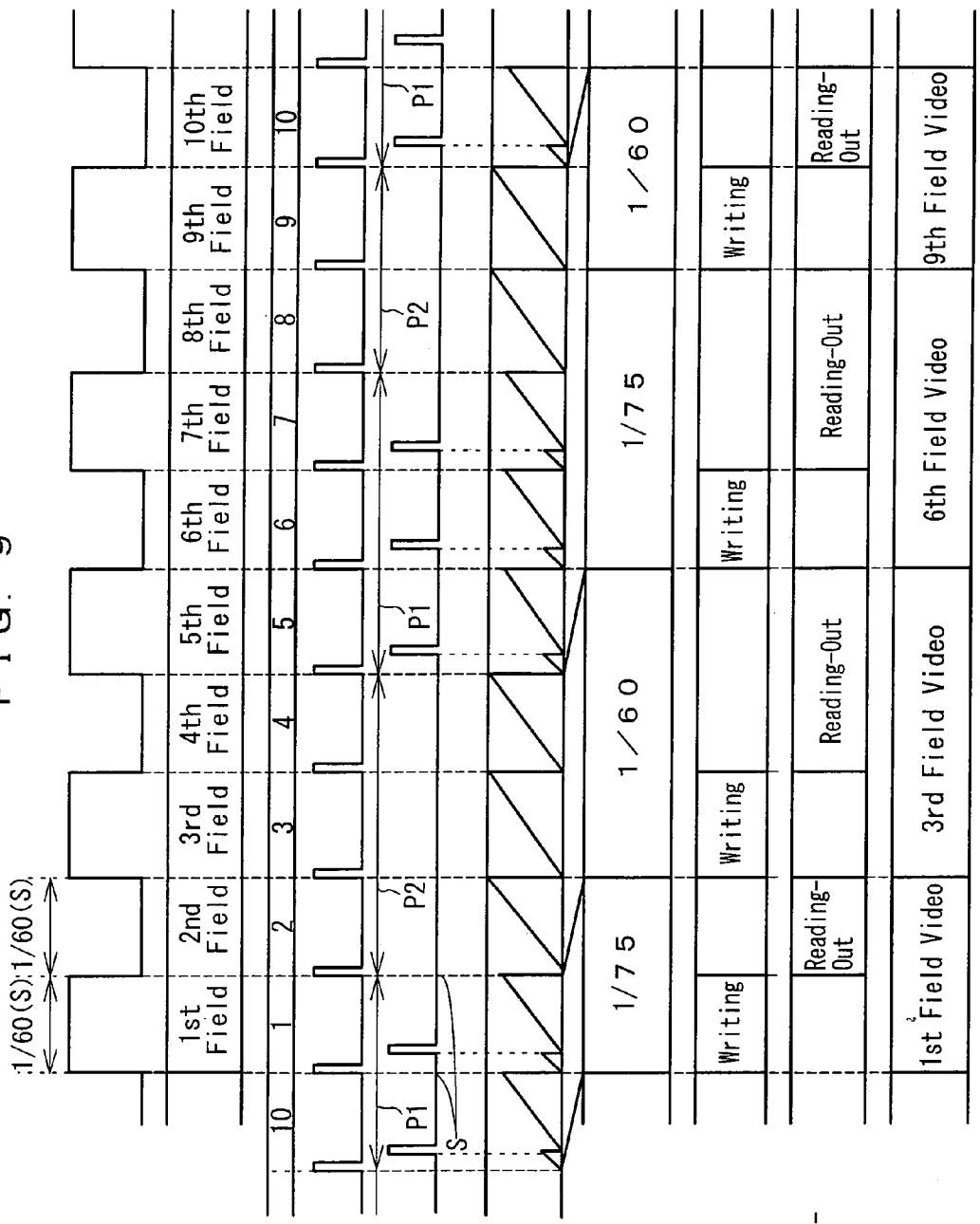
FIG. 9 is a third operation timing chart of the video signal processor according to the second embodiment of the present invention.

Next, described is the control of the case where the film image effect (flicker) is artificially generated at the 2:3:3:2 pull-down cycle by referring to FIG. 9.

The control of this case is basically the same as the case of artificially generating the film image effect at the 2:3 pull-down cycle, so that the description in regards to the same components and the control will be omitted.

The cyclic counter 105 repeatedly calculates the ten fields from the 1st-10th fields. The cyclic counter 105 repeatedly supplies the count values of the 1st-10th fields to each field forming the output video signal 202.

The count values of the cyclic counter 105 indicating the writing field of the field memory 410 are set beforehand and the memory controller 412 stores the set count values to be written. In the case of adding the film image effect at the 2:3:3:2 pull-down cycle, the count values to be written are "1", "3", "6", "9".

The memory controller 412 outputs an execution command to the field memory 410 for writing the output video signal 202 at the timing where the count values of the output video signal 202 supplied by the cyclic counter 105 are the count values indicating the field to be written. The execution command for writing the output video signal 202 is supplied to the field memory 410 as a field memory writing control signal 208 as shown in FIG. 8.

The count values of the cyclic counter 105 indicating the reading-out timing from the field memory 410 are set beforehand and the memory controller 412 stores the set count values of the reading-out timing. In the case of artificially adding the film image effect at the 2:3:3:2 pull-down cycle, the count values of the reading-out timing are "2", "4", "5", "7", "8", "10".

The memory controller 412 outputs an execution command for reading out to the field memory 410 at the timing where the count values of the output video signal 202 supplied by the cyclic counter 105 corresponds to the count values of the reading-out timing. The execution command for reading-out is supplied to the field memory 410 as a field memory reading-out control signal 209 as shown in FIG. 9.

In the case where the film image effect is artificially supplied at the 2:3:3:2 pull-down cycle, for example, the memory controller 412 gives a writing command of the output video signal 202 to the field memory 410 at the timing where the count values of the cyclic counter 105 are "1", "3", "6", "9". In the meantime, the memory controller 412 gives a reading-out command to the field memory 410 at the timing where the count values of the cyclic counter 105 are "2" "4", "5", "7", "8", "10".

The output selection by the selector 411 is controlled by the count values of the cyclic counter 105. The interaction between the count value of the cyclic counter 105 and the operation of the output selection of the selector 411 is set beforehand and the memory controller 412 stores the pre-set interaction.

In the selector 411, the output video signal 202 and the reading-out output of the field memory 410 are inputted. The memory controller 412 controls the selector 411 according to the field count values of the output video signal 202 supplied by the cyclic counter 105. Specifically, the memory controller 412 controls the selector 411 so that the output video signal 202 and the reading-out output of the field memory 410 are switched to be outputted.

When artificially supplying the film image effect at the 2:3:3:2 pull-down cycle, the above-described interaction stored in the selector 411 is as follows. That is, when the count values are "1", "3", "6", "9" the selector 411 selects the output video signal 202 of the CCD 101 and, when the count values are "2", "4", "5", "7", "8", "10", selects the reading-out output of the field memory 410.

Thus, at the timing of executing the writing to the field memory 410 (the timing where the count values of the cyclic counter 105 are "1", "3", "6", "9"), the selector 411 selects and output the output video signal 202 of the CCD 101. In the meantime, at the timing of executing the reading-out from the field memory 410 (the timing where the count values of the cyclic counter 105 are "2", "4", "5". "7", "8", "10"), the selector 411 selects and output the reading-out output of the field memory 410. Thereby, the selector 411 repeatedly outputs the 60I video signal in which the writing is executed to the field memory 410 as shown by selector output video signal 210 of FIG. 9 until the next writing is executed.

Thereby, in the selector output video signal 210, the control is carried out for repeating the processing of continuously outputting: the video signals of the two continuous (1×n)–(2×n) fields of the ten continuous (1×n–10×n) fields; the video signals of the three continuous (3×n)–(5×n) fields; the video signals of the three continuous (6×n)–(8×n) fields; and then the video signals of the two continuous (9×n)–(10×n) fields. The "n" is a natural number.

Therefore, in the selector output video signal 210 outputted from the selector 411, image changes (change in the motion of the object being taken) by every twenty-four frames resembling the 24P video signal are generated. Moreover, in the selector output video signal 210, image changes (change in the luminance) by every twenty-four frames resembling the film image is generated at the 2:3:3:2 pull-down cycle.

Because of the above-described reasons, the film image effect (flicker) is artificially added to the selector output video signal 210 at the 2:3:3:2 pull-down cycle with high-precision.

As described, through combining the updating of the 60I video signal which is outputted by every 2, 3 fields corresponding to the 2:3 pull-down cycle or by every 2, 3, 3, 2 fields corresponding to the 2:3:3:2 pull-down cycle and the flicker effect by the gain control of the luminance signal, it is possible to easily achieve the visual effect in the 60I video signal such as that of the film taken by the 24P video signal without inputting the 24P video signal.

Figure 10:
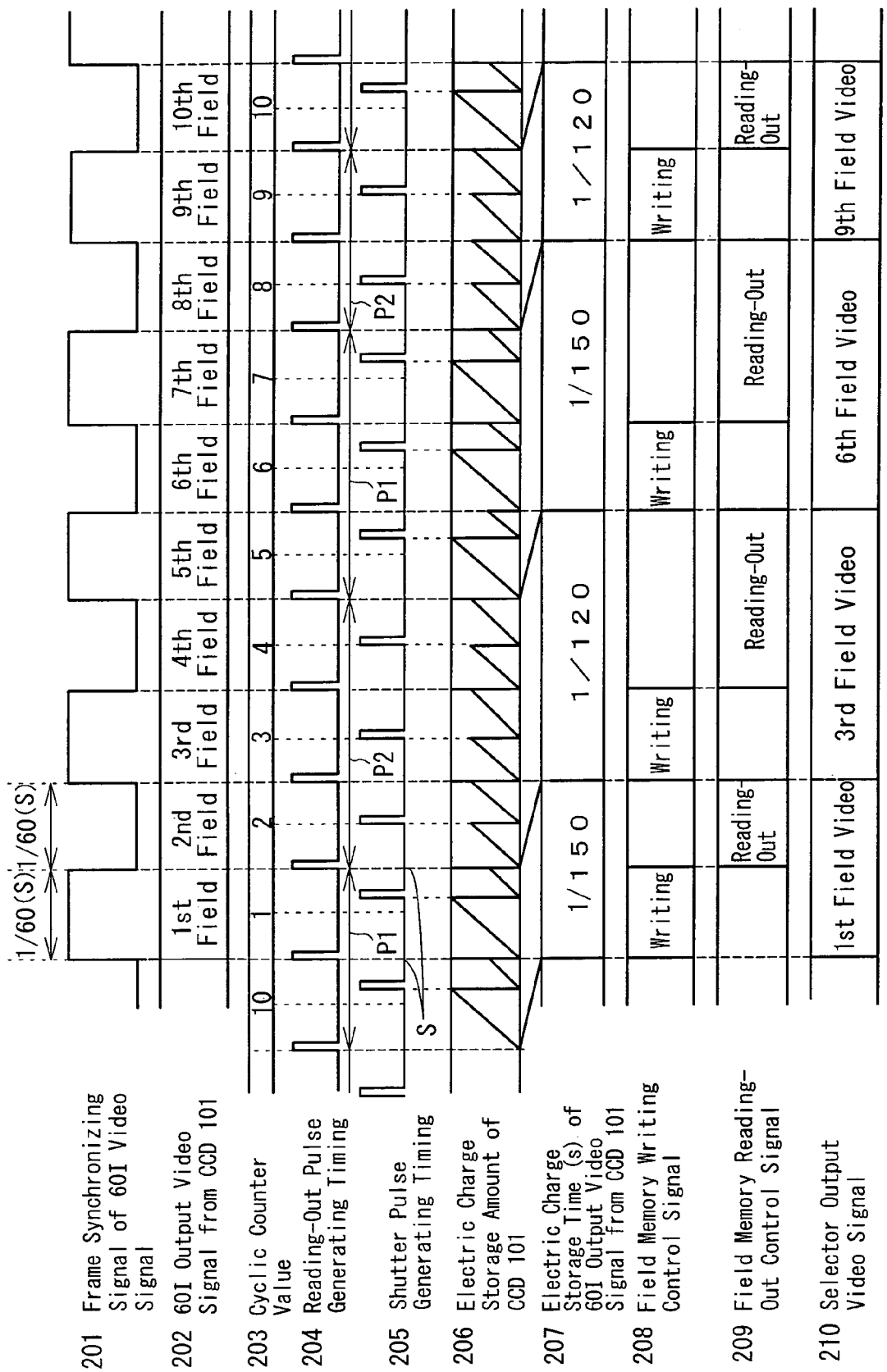
FIG. 10 is a fourth operation timing chart of the video signal processor according to the second embodiment of the present invention.

When performing the embodiment under the state where the film image effect (flicker) is artificially generated at the 2:3:3:2 pull-down cycle, it is performed by fixing the shutter speed not only to 1/60 second as described by referring to FIG. 9 but also under the state where the shutter speed is set arbitrarily. FIG. 10 shows the configuration for performing the embodiment in the case where the shutter speed is set as 1/120 second and the storage time is set as 1/150 second in the field of the variable electric charge storage time. In this case, the variable control of the electric charge storage time is the same as that described above by referring to FIG. 5. In the form of the control shown in FIG. 10, the control operations by the field memory 410, the selector 411 and the memory controller 412 are the same as those described above by referring to FIG. 9. As shown in this example, the embodiment can be performed under the state where the shutter speed is set arbitrarily.

The timing of switching the output of the selector 411 executed by the memory controller 412 and the timing of switching the control value of the shutter pulse generator 109 executed by the variable controller 104 are the same. The timing is controlled by the cyclic counter 105. The cyclic counter 105 may be provided to any one selected from the memory controller 412 and the variable controller 104, as long as the both can be controlled at the timing generated by the cyclic counter 105 being provided to either one. Moreover, the cyclic counter may be individually provided to each as long as the timing generated by each counter is the same.

In the description of the second embodiment, the device configuration (referred to as the first structure B1 hereinafter) constituted of the variable controller 104 is disposed on the back-row side in the signal transmitting direction with respect to the device configuration (referred to as the second structure B2 hereinafter) constituted of the field memory 410, the selector 411 and the memory controller 412. However, the second structure B2 may be disposed on the front-row side of the signal transmitting direction with respect to the first structure B1.

In the above-described embodiments, the flicker effect is generated by changing the electric charge storage time to 1/75 second (in the case where the shutter speed is 1/60 second) or to 1/150 second (in the case where the shutter speed is 1/120 second). However, the control amount of the electric charge storage time is not limited to these values. It is possible to artificially develop the image effect as in the case of displaying the film image most effectively by setting the difference of the controlled value of the electric charge storage time with respect to the shutter speed to be about 5-15%, and more desirably, to be about 10%. Examples of the ratio of control amount of the electric charge storage time to the shutter speed which enable to achieve the same effect are 1.05 times and 0.95 times, 1.1 times and 1.0 times, etc.

Moreover, in the above-described embodiments, the present invention is performed in the device configuration which artificially generates the film image effect in the 60I video signal. However, the present invention can similarly be performed by a device configuration which artificially generates the film image effect in 50I video signal (PAL system video signal) as well.

In the case where the present invention is performed in an interlace video signal, it is preferable that the variable controller controls to make the image block per second synchronize with the frame cycle of the video signal. The reason will be provided in the followings by referring to FIG. 11.

The 60I video signal which is the control target in the above-described embodiments is the interlace signal. As for the interlace signal, each frame as the structural element of the video signal is constituted of a pair of fields. Meanwhile, the control of the electric charge storage time according to the present invention is executed by a field unit as described above.

When the present invention is performed in the interlace signal, there generates a state where the change point of the luminance signal synchronizes with the frame and positioned at the boundary of the frame and a state where it is positioned inside the frame without synchronizing with the frame. The state with the change point being inside the frame means the state where the luminance change point is positioned in between a pair of the fields constituting the same frame. When the luminance change point is inside the frame, the luminance change is caused between the fields constituting one frame. Such a video image gives a feeling of wrongness to viewers visually. Therefore, it is preferable that such state with the luminance change point being inside the frame be reduced as much as possible.

However, especially, in order to generate the film image effect artificially through performing the present invention on the interlace signal, it is impossible to avoid the state where the change point of the electric charge storage time is positioned inside the frame. In the case where the film image effect is generated on the 60I video signal at 2:3:3:2 pull-down cycle, it is possible to reduce the state with such position of the change point of the electric charge storage time which causes such inconvenience as much as possible in the manner described as follows.

In the present invention, when the film image effect is artificially generated in the video signal, it is regarded that a cluster of the above-described image block for one second is continuously arranged in the video signal. When the film image effect is generated in the 60I video signal at the 2:3:3:2 pull-down cycle, six blocks of the image block (ten fields) constitutes each cluster for one second, and the cluster of the image block (ten fields) are continuously arranged in the 60I video signal.

Figure 11:
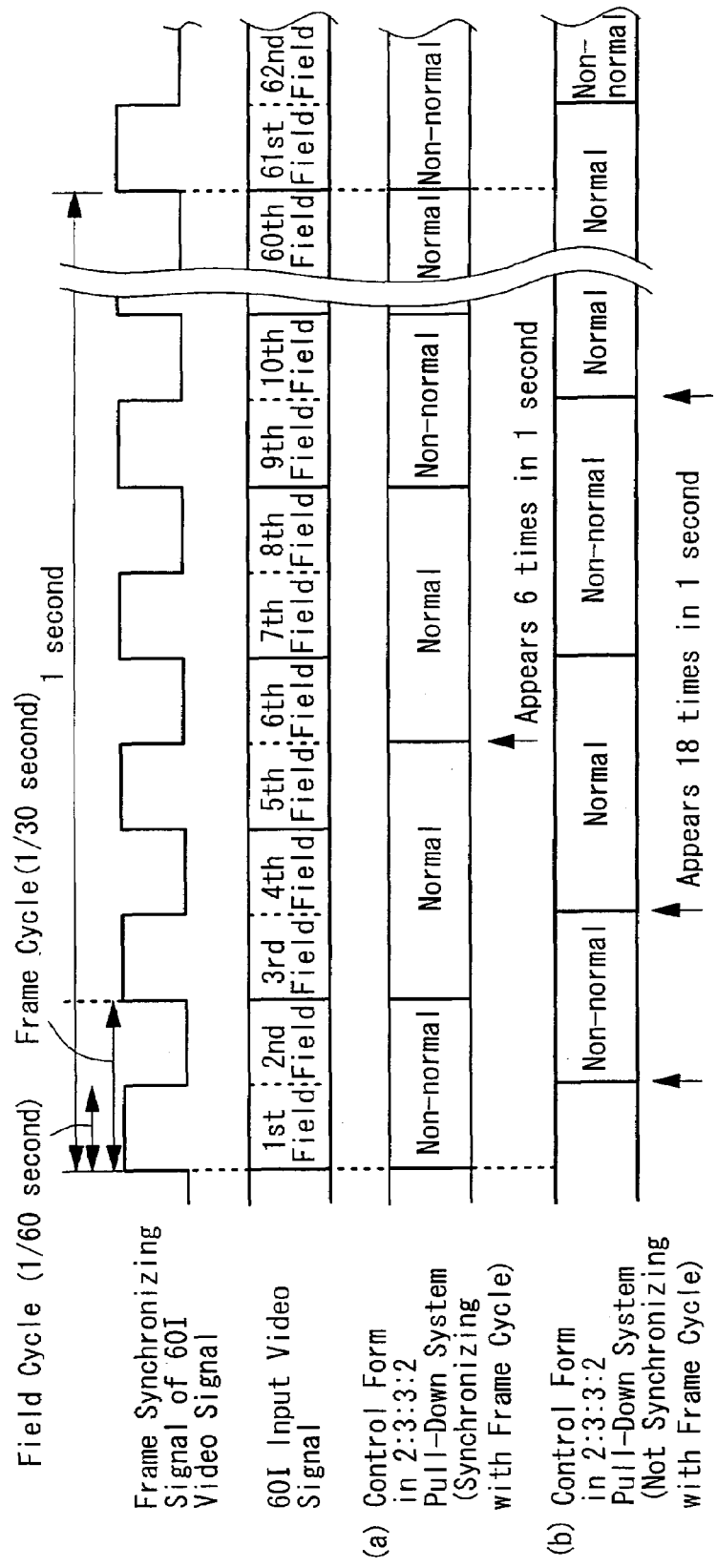
FIG. 11 is an operation timing chart of a modification example of the present invention.
Figure 12:
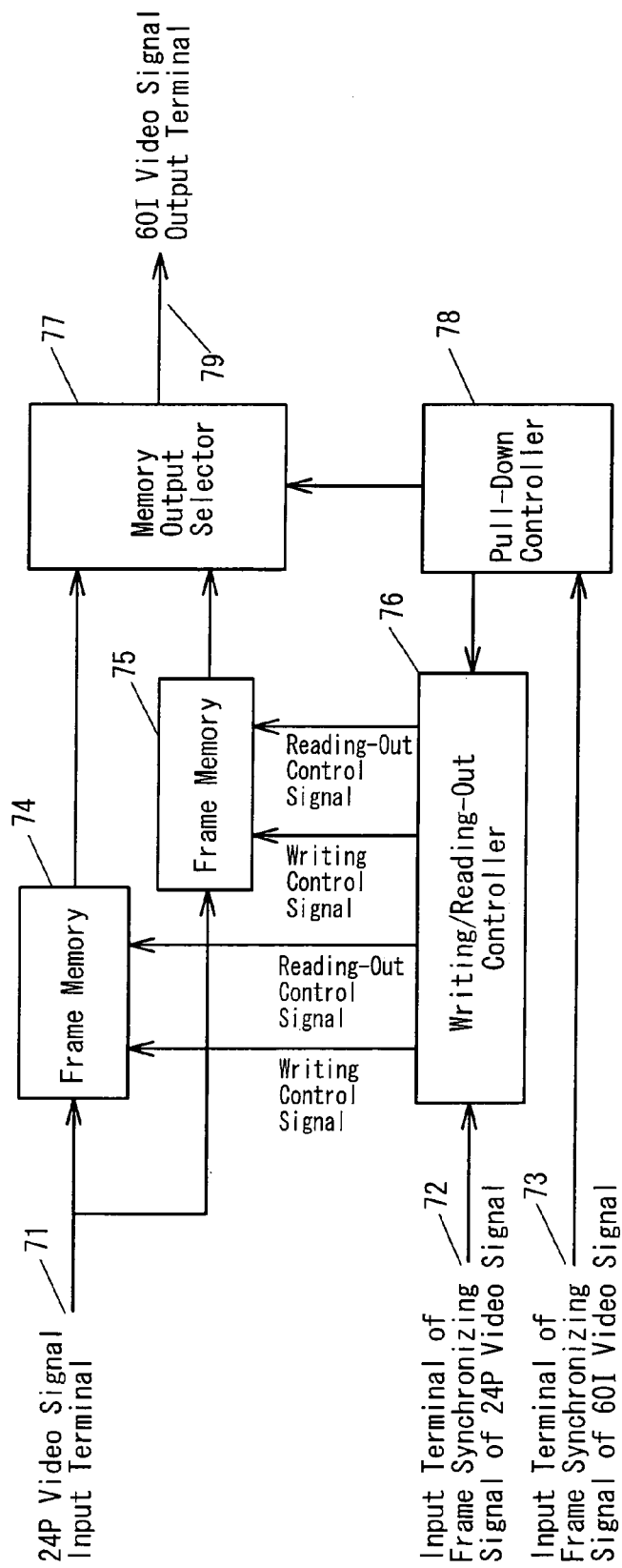
FIG. 12 is a block diagram showing a conventional video signal processor.
Figure 13:
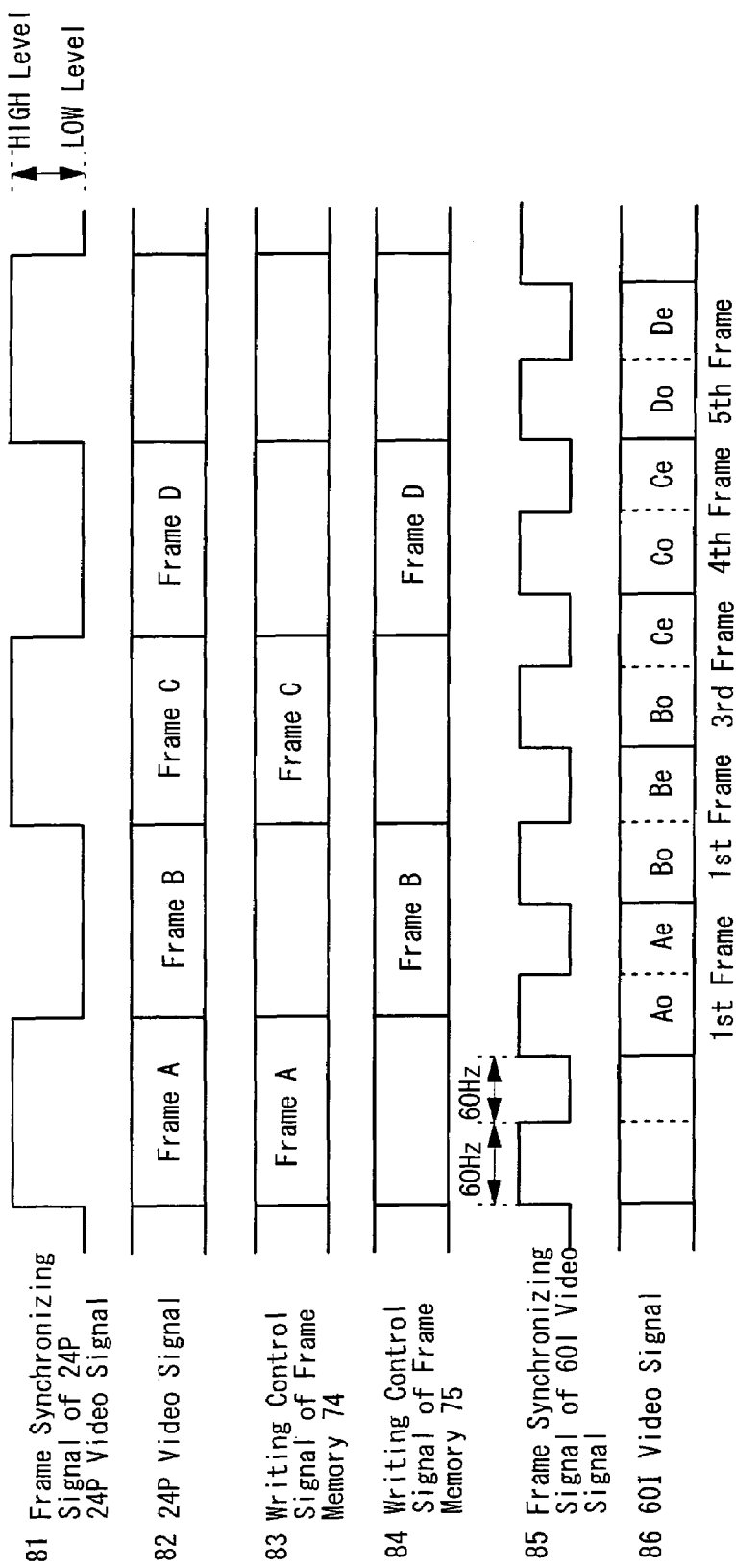
FIG. 13 is an operation timing chart of the conventional video signal processor.

FIG. 11 shows the control form of the video signal in the case where the film image effect is artificially generated in the 60I video signal at the 2:3:3:2 pull-down cycle through performing the present invention. In FIG. 11, (a) shows the state where each cluster of the image block for one second synchronizes with the frame cycle when artificially generating the film image effect at the 2:3:3:2 pull-down cycle. (b) shows the state where each cluster of the image block for one second does not synchronizes with the frame cycle when artificially generating the film image effect at the 2:3:3:2 pull-down cycle.

As shown in FIG. 11, in the case of artificially generating the film image effect at the 2:3:3:2 pull-down cycle, the state where the change point of the electric charge storage time is inside the frame appears eighteen times in one second when each cluster of the image block for one second does not synchronize with the frame cycle. In the meantime, when each cluster of the image block for one second synchronizes with the frame cycle the state where the change point of the electric charge storage time is inside the frame appears six times in one second, which is reduced by ⅓.

As evident from this point of view, when artificially generating the film image effect at the 2:3:3:2 pull-down cycle through performing the present invention on the 60I video signal, by synchronizing each cluster of the image block for one second with the frame cycle, it is possible to reduce the frequency of generating the state where the change point of the electric charge storage time is inside the frame.

The control shown in FIG. 11 which achieves such effect can be used not only in the case of artificially generating the film image effect at the 2:3:3:2 pull-down cycle, but also in the case of performing the present invention on the 50I video signal and the like as well. In those cases, the same effects can be achieved.

In the above-described first, second embodiments, it is not essential to synchronize with the cycle of the 2:3:3:2 pull-down system or to that of the 2:3:pull-down system. Simply, the control value (electric charge storage time) may be switched by every two fields (one frame). In this case, in the output image, the electric charge storage time in the CCD 101 changes thirty times in one second, so that it is possible to obtain the visual effect similar to the embodiments, as if watching the video of 30 frames/second.

Moreover, the present invention can be applied not only to the 60I video signal, but also to the 50I video signal and the like as long as it is the interlace system video signal.

Although the present invention has been described by referring to the above-described embodiments, it is not intended to be limited only to the above-described embodiments but various modifications are possible within the sprit and scope of the appended claims.

What is claimed is:

1. A video signal processor, comprising:

a CCD for storing an inputted image by converting it into an electric charge through photoelectrical conversion to be stored by each field and then outputting said stored electric charge by each field;

a shutter pulse generator for supplying a shutter pulse which adjusts storage time of said electric charge in said CCD; and a variable controller for variably controlling adjusting amount of electric charge storage time by said shutter pulse by a field unit;

wherein said variable controller, after setting plural shutter pulses with electric charge storage time being different from each other, alternately arranges said set shutter pulses, respectively, on a time base by corresponding to plural continuous fields;

said variable controller, as said plural shutter pulses, sets a first shutter pulse having electric charge storage time equivalent to a time length of a field and a second shutter pulse having electric charge storage time shorter than that of said first shutter pulse; and said variable controller omits setting of said first shutter pulse.

2. A video signal processor, comprising:

a CCD for storing an inputted image by converting it into an electric charge through photoelectrical conversion to be stored by each field and then outputting said stored electric charge by each field;

a shutter pulse generator for supplying a shutter pulse which adjusts storage time of said electric charge in said CCD; and a variable controller for variably controlling adjusting amount of electric charge storage time by said shutter pulse by a field unit;

wherein said variable controller, after setting plural shutter pulses with electric charge storage time being different from each other, alternately arranges said set shutter pulses, respectively, on a time base by corresponding to plural continuous fields; and said variable controller performs a shutter pulse control periodically by a unit of five continuous fields, for setting a first shutter pulse in first and second fields in said unit of five fields and for setting a second shutter pulse with electric charge storage time different from said first shutter in third, fourth, fifth fields in said unit of five fields.

3. A video signal processor, comprising:

a CCD for storing an inputted image by converting it into an electric charge through photoelectrical conversion to be stored by each field and then outputting said stored electric charge by each field;

a shutter pulse generator for supplying a shutter pulse which adjusts storage time of said electric charge in said CCD; and a variable controller for variably controlling adjusting amount of electric charge storage time by said shutter pulse by a field unit;

wherein said variable controller, after setting plural shutter pulses with electric charge storage time being different from each other, alternately arranges said set shutter pulses, respectively, on a time base by corresponding to plural continuous fields; and said variable controller performs a shutter pulse control periodically by a unit of ten continuous fields, for setting a first shutter pulse in first, second, sixth, seventh, eighth fields in said unit of ten fields and for setting a second shutter pulse with electric charge storage time different from said first shutter in third, fourth, fifth, ninth, tenth fields in said unit of ten fields.

4. The video signal processor according to claim 3, wherein said variable controller controls a cluster of each image block per second to synchronize with a frame cycle of said output video signal.

* * * * *